United States Patent [19]

Whitney et al.

[11] Patent Number: 4,612,642

[45] Date of Patent: Sep. 16, 1986

[54] OPERATION OF TRANSVERSELY EXCITED $N_2O$ LASERS

[75] Inventors: Wayne T. Whitney, Oxon Hill, Md.; Hiroshi Hara, Funabashi, Japan

[73] Assignee: The United States of America as represented by the Secretary of the Navy, Washington, D.C.

[21] Appl. No.: 651,399

[22] Filed: Sep. 17, 1984

[51] Int. Cl.[4] ............................................. H01S 3/00
[52] U.S. Cl. ...................................... 372/33; 372/55; 372/60; 33/147 F
[58] Field of Search ............................. 372/33, 55, 60

[56] References Cited

U.S. PATENT DOCUMENTS

| | | | |
|---|---|---|---|
| 3,668,550 | 6/1972 | Bullis et al. | 331/94.5 |
| 3,761,838 | 9/1973 | Bhaumik et al. | 372/60 |
| 3,810,043 | 5/1974 | Locke et al. | 372/60 |
| 3,813,612 | 5/1974 | Schriever et al. | 331/94.5 G |
| 4,068,194 | 1/1978 | Malarkey et al. | 372/60 |
| 4,088,965 | 5/1978 | Lauderslager et al. | 331/94.5 G |
| 4,109,952 | 8/1978 | Tulip | 294/16 |
| 4,114,113 | 9/1978 | Hasson et al. | 331/94.5 G |
| 4,134,083 | 1/1979 | Sasnett et al. | 372/33 |
| 4,155,052 | 5/1979 | Osche et al. | 331/94.5 |
| 4,236,123 | 11/1980 | Richardson et al. | 372/60 |
| 4,242,645 | 12/1980 | Siemson et al. | 372/60 |

OTHER PUBLICATIONS

O'Neill et al; "Continuously Tunable Multiatmospheric $N_2O$ and $CS_2$ Lasers"; *Applied Physics Letters;* vol. 28, No. 9; 1976; pp. 539–541.

Deutch, "Effect of Hydrogen on $CO_2$ TEA Lasers"; Applied Physics Letters, vol. 20, No. 8, Apr. 15, 1972.

Whitney et al., "Improved Operation of $N_2O$ TE Lasers"; IEEE Journal of Quantum Electronics, vol. QE-19, No. 11, Nov. 1983.

*Primary Examiner*—William L. Sikes
*Assistant Examiner*—Robert E. Wise
*Attorney, Agent, or Firm*—Sol Sheinbein; Stephen G. Mican

[57] ABSTRACT

An improved method and apparatus for producing high power, high efficiency pulsed TEA laser energy at $N_2O$ wavelengths by suppressing discharge arc formation with $H_2$ or CO that is added to the $N_2O$ lasing medium. Energy loading levels up to in the range of 266 J/L atm are achieved with gas mixtures of $N_2$ lasing mediums and $H_2$ or CO additives comprising $N_2O$:He:$N_2$:$H_2$::0.03:0.69:0.27:0.01 and $N_2O$:He:$N_2$:CO::0.03:0.66:0.26:0.05 mole fraction.

18 Claims, 1 Drawing Figure

PULSED TE $N_2O$ LASER DIAGRAM

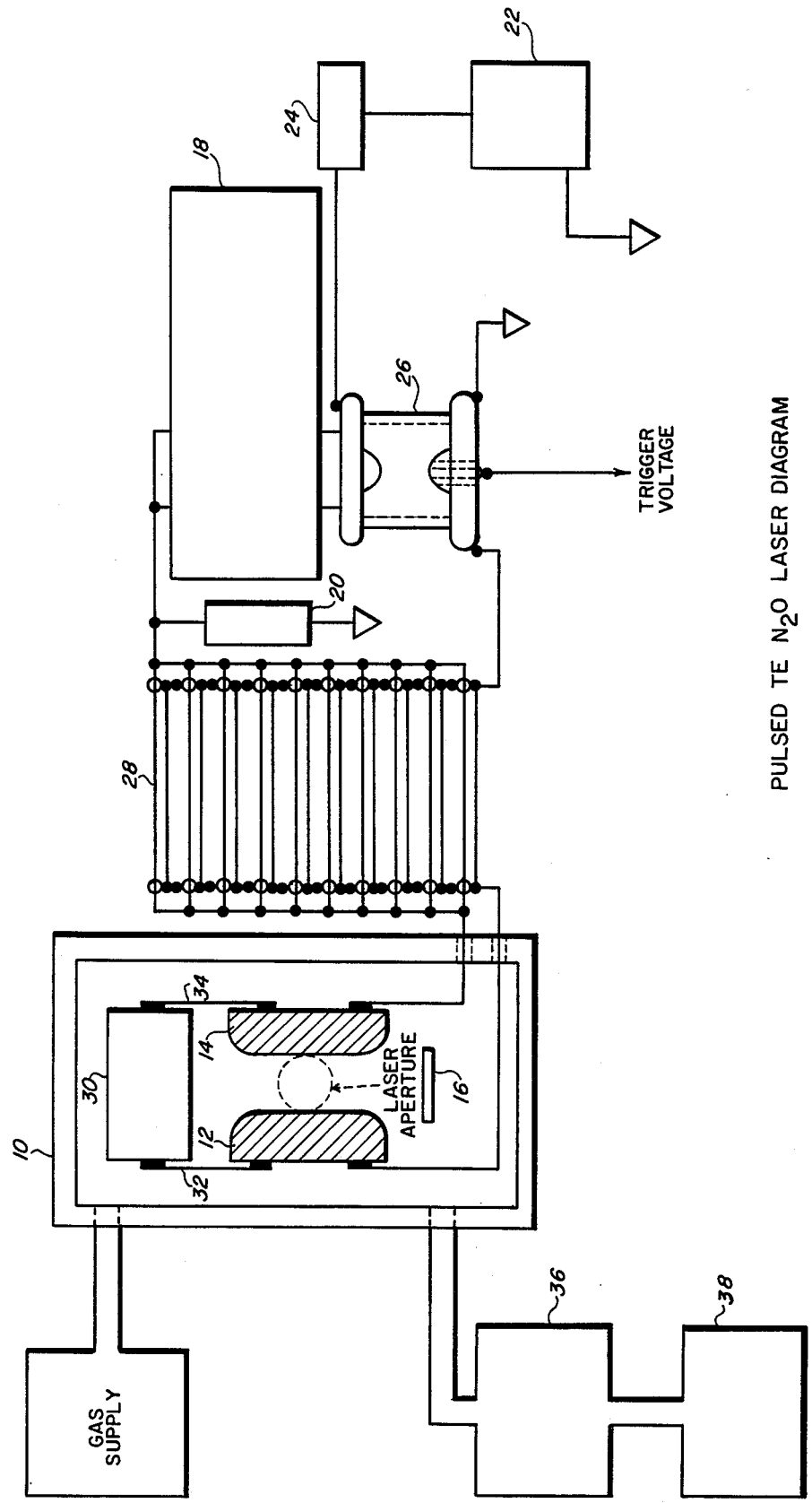

OPERATION OF TRANSVERSELY EXCITED N₂O LASERS

BACKGROUND OF THE INVENTION

This invention relates to transversely exited (TE) $N_2O$ lasers and particularly to methods and apparatus for discharge arc suppression in TE $N_2O$ lasers.

The wavelengths produced by lasers using an $N_2O$ lasing medium are highly desirable because of their high atmospheric transmission factor. Although the flowing-gas continuous-wave (cw) $CO_2$ laser can easily be converted to operation on $N_2O$ wavelengths by the simple replacement of $CO_2$ by $N_2O$ in the gas flow, pulsed glow discharge TE laser operation is plagued by discharge arcing when the lasing medium is changed from $CO_2$ to $N_2O$. This is because the disassociative attachment cross sections for $N_2O$ are one to two orders of magnitude larger than for $CO_2$ for the range of electron energies expected in the discharge. These large disassociative attachment cross sections of $N_2$ cause an excessive buildup of negative oxygen ions within the lasing medium which induces discharge arcing.

Conventional methods for controlling discharge arcing generally provide an auxiliary means of ionization which does not depend upon the discharge current. For instance, an injection of a high energy beam of electrons between the discharge electrodes or the ionizing electromagnetic radiation from an auxiliary discharge adjacent to the discharge electrodes, such as a capacitive spark discharge of short duration, may be used. Preionization with an injected electron beam is limited to low ratios of electric field in the discharge to neutral particle density in the discharge so that the discharge is non-sustainable without the electron beam. Neither of these methods is suitable to overcome the high electron attachment rates due to use of the $N_2O$ medium for lasing, resulting in weak lasing under a limited range of conditions.

OBJECTS OF THE INVENTION

Accordingly, one object of the present invention is to generate high power output from a TE $N_2O$ laser.

Another object of the present invention is to increase the operating efficiency of a TE $N_2O$ laser.

Yet another object of the present invention is to operate a TE $N_2O$ laser under a wide range of operating conditions.

A further object of the present invention is to suppress discharge arcing in a TE $N_2O$ laser.

A still further object is to control negative ion formation caused by electron attachment to $N_2O$ in a $N_2O$ TE laser.

SUMMARY OF THE INVENTION

The present invention allows a TE $N_2O$ laser to operate at high power with high efficiency and under a wide range of operating conditions by suppressing the formation of discharge arcing by means of the addition of $H_2$ or CO to the lasing medium, the $H_2$ or CO gas serving to reduce the formation of ions due to $N_2O$ electron attachment.

The foregoing, as well as other objects, features and advantages of the invention will be apparent from the following description of the preferred embodiment of the invention, and the novel features will be particularly pointed out hereinafter in connection with the appended claims.

DESCRIPTION OF THE DRAWINGS

The FIGURE is an illustration of a pulsed TE $N_2O$ laser in accordance with the present invention.

DETAILED DESCRIPTION OF THE INVENTION

Referring to the FIGURE, wherein reference characters designate like or corresponding parts throughout the views, the preferred embodiment of the invention is illustrated. A TE laser 10 having a pair of solid copper electrodes 12, 14 with approximate Rogowski profiles and a discharge volume of approximately $2\times2\times100$ cm is used. A spark board 16 for preionization is energized by an electrical power source (not shown) in the range of 0 to 20, but preferably 1 to 2, microseconds before triggering a discharge across electrodes 12,14. An energy storage capacitor 18 of 100 nf having a bleeder resistance 20 and charged by electrical power source 22 through dropping resistance 24, is connected to the discharge electrodes 12,14 through a triggered spark gap 26 by ten coaxial cables 28 having a total circuit inductance of approximately 125 nH. A peaking capacitance of approximately 15 nF consisting of 16 ceramic capacitors 30 is connected in parallel with the discharge electrodes 12,14 by two copper sheets 32,34 oriented along the length of the electrodes 12,14 to assume a low inductance configuration may be used, though not required. This peaking capacitance effectively eliminates the inductance of the triggered spark gap 26, storage capacitor 18 and coaxial cables 28, so that the glow discharge can take place in a shorter time, thus allowing less time for an arc to develop. A gas mixture comprising an $N_2O$ gas lasing medium and a gas additive are maintained at constant pressure within the TE laser 10 by a pressure regulator 36 and a vacuum pump 38.

The gas additive comprising either $H_2$ or CO is added to the $N_2O$ lasing medium to suppress discharge arcing. The dissociative electron attachment reaction $e^- + N_2O \rightarrow N_2 + O^-$ is thereby nullified by the addition of $H_2$ or CO by means of the reactions $O^- + H_2 \rightarrow H_2O + e^-$ or $O^- + CO \rightarrow CO_2 + e^-$. Although either $H_2$ or CO can be used to stabilize the $N_2O$ TEA laser discharge, a much greater concentration of CO is required, compared with $H_2$, and laser energy output is reduced due to the high concentration of CO interfering with the lasing mechanism. Using $H_2$, the optimum gas mixture is on the order of $N_2O:He:N_2:H_2::0.03:0.69:0.27:0.01$ mole fraction, and the optimum output mirror transmission is approximately 20 percent. With the optimum gas mixture and output coupling, laser energy obtained at a gas pressure of 260 torr is 0.42J (4.8 J/L·atm) at an energy loading of 266 J/L·atm, producing an efficiency of 1.8 percent. At a lower energy loading of 166 J/L·atm, the laser output energy is 0.3J (3.9 J/L·atm), producing an efficiency of approximately 2.4 percent. The present invention will also provide acceptable operation with $H_2$ concentrations ranging from approximately 0.75 to 2 percent and with gas pressures ranging from approximately 100 to 300 torr.

Using CO, the optimum gas mixture is on the order of $N_2O:He:N_2:CO::0.03:0.66:0.26:0.05$ mole fraction and optimum output mirror transmission is unchanged, at 20 percent. The range of CO concentration may be in the range of 4 to 10 percent and the gas pressure is unchanged, approximately 100 to 300 torr. At a working pressure of 160 torr, the output of the laser with CO is approximately 60 percent of the output with $H_2$, using the optimum gas mixtures. Although the operation of the present invention is indicated at ambient temperature, lower temperatures may be used, down to the lower limit dictated by the condensation point for the laser gas, with somewhat improved results. Temperatures elevated above ambient may also be used, with corresponding degradation in performance.

The method of suppressing arc discharge in a pulsed TE $N_2O$ laser is as follows: A gas lasing medium is selected including $N_2O$, He and $N_2$. Next a gas additive for the lasing medium is selected which comprises either $H_2$ or CO. The gas lasing medium and the gas additive are then combined within the TE laser 10 to form a gas mixure including $N_2O$, He, $N_2$ and either $H_2$ or CO. The gas mixture is pressurized within the laser 10 at constant pressure by pressure regulator 36 and the vacuum pump 38. The gas mixture within the TE laser 10 is then energized by first preionizing the gas mixture in the vicinity of electrodes 12,14 by an electrical discharge from the sparkboard 16, then triggering the triggered spark gap 26 to permit electrical energy stored in the energy storage capacitor 18 charged by electrical power source 22 through dropping resistance 24 to pass through coaxial cables 28 and copper sheets 32,34 into the peaking capacitance comprising the capacitors 30, and discharging across the electrodes 12,14 which causes lasing action in the gas mixture.

It will be understood that various changes in the details, materials and arrangements of parts which have been herein described and illustrated in order to explain the nature of the invention may be made by those skilled in the art within the principle and scope of the invention as expressed in the appended claims.

What is claimed and desired to be secured by letters patent of the United States is:

1. A method of suppressing discharge arcing in a pulsed transversely excited laser operating at $N_2O$ wavelengths, comprising:
   utilizing a gas lasing medium including $N_2O$;
   utilizing a gas additive including $H_2$ for said lasing medium which combines with negative oxygen ions to form neutral molecules and electrons;
   combining said gas additive with said lasing medium to form a gas mixture including $N_2O$;
   pressurizing said gas mixture in said laser; and
   energizing said gas mixture in said laser to generate lasing action.

2. The method of suppressing discharge arcing according to claim 1, wherein the step of utilizing a gas lasing medium includes utilizing a gas lasing medium including $N_2O$, He and $N_2$.

3. The method of suppressing discharge arcing according to claim 2, wherein the step of combining said gas additive includes combining said gas additive to form said gas mixture including $N_2O$, He, $N_2$ and $H_2$.

4. The method of suppressing discharge arcing according to claim 3, wherein the step of combining said gas additive includes combining said gas additive to form said gas mixture including approximately 0.5 to 2 percent $H_2$.

5. The method of suppressing discharge arcing according to claim 4, wherein the step of combining said gas additive includes combining said gas additive to form said gas mixture including $N_2O$, He, $N_2$ and $H_2$ in the proportion $N_2O:He:N_2:H_2::0.03:0.69:0.27:0.01$ mole fraction.

6. The method of suppressing discharge arcing according to claim 5, wherein the step of pressurizing said gas mixture includes pressurizing said gas mixture to a pressure in the range of 100 to 300 torr.

7. The method of suppressing discharge arcing according to claim 6, wherein the step of energizing said gas mixture includes energizing said gas mixture up to an energy loading level in the range of 266 J/L atm.

8. A method of suppressing discharge arcing in a pulsed transversely excited laser operating at $N_2O$ wavelengths comprising:
   utilizing a gas additive comprising $H_2$;
   combining said gas additive with said lasing medium to form a gas mixture including $N_2O$, He, $N_2$ and $H_2$ in the proportion $N_2O:He:N_2::0.03:0.69:0.01$ mole fraction;
   pressurizing said gas mixture in said laser; and
   energizing said laser to generate lasing action at an energy loading level up to in the range of 266 J/L atm.

9. In a pulsed TE laser operating at $N_2O$ wavelengths, a discharge arc suppression system comprising:
   a gas lasing medium including $N_2O$;
   a gas additive for said lasing medium comprising $H_2$ which combines with negative oxygen ions to form neutral molecules and electrons;
   pressurization means for containing said lasing medium with said gas additive to form a gas mixture including $N_2O$, He, $N_2$ and $H_2$ under pressure; and
   energizing means for energizing said gas mixture to produce lasing action.

10. The discharge arc suppression system according to claim 9, wherein said gas mixture includes $N_2O$, He, $N_2$ and $H_2$.

11. The discharge arc suppression system according to claim 10, wherein said gas mixture includes approximately 0.5 to 2 percent $H_2$.

12. The discharge arc suppression system according to claim 11, wherein said gas mixture includes $N_2O$, He, $N_2$ and $H_2$ in the proportion $N_2O:He:N_2:H_2::0.03:0.69:0.27:0.01$ mole fraction.

13. The discharge arc suppression system according to claim 12, wherein said pressurization means further includes means for maintaining a pressure in the range of 100 to 300 torr.

14. In a pulsed TE laser operating at $N_2O$ wavelengths, a discharge arc suppression system comprising:
   a gas lasing medium including $N_2O$;
   a gas additive for said lasing medium comprising CO which combines with negative oxygen ions to form neutral molecules and electrons;
   pressurization means for containing said lasing medium with said gas additive to form a gas mixture including $N_2O$, He, $N_2$ and approximately 4 to 10 percent CO under pressure; and
   energizing means for energizing said gas mixture to produce lasing action.

15. The discharge arc suppression system according to claim 14, wherein said gas mixture includes $N_2O$, He, $N_2$ and CO in the proportion $N_2O:He:N_2:CO::0.03:0.66:0.26:0.05$ mole fraction.

16. The discharge arc suppression system according to claim 15, wherein said pressurization means further includes means for maintaining a pressure in the range of 100 to 300 torr.

17. The discharge arc suppression system according to claim 16, wherein said energizing means further includes means for providing an energy loading level up to in the range of 266 J/L·atm.

18. In a pulsed TE laser operating at $N_2O$ wavelengths, a discharge arc suppression system comprising:

a gas lasing medium including $N_2O$, He and $N_2$;

a gas additive for said lasing medium comprising $H_2$;

a pressurization means for containing said lasing medium with said gas additive at a pressure in the range of 100 to 300 torr to form a gas mixture comprising $N_2O$, He, $N_2$ and $H_2$ in the proportion $N_2O:He:N_2:H_2::0.03:0.69:0.27:0.01$ mole fraction; and energizing means for energizing said gas mixture at an energy loading level up to in the range of 266 J/L·atm.

* * * * *